United States Patent [19]

Wertsberger

[11] Patent Number: 5,303,204

[45] Date of Patent: Apr. 12, 1994

[54] SUBMERGED OBJECT WARNING AND LOGGING SYSTEM

[76] Inventor: Shalom Wertsberger, P.O. Box 2769, South Portland, Me. 04116-2769

[21] Appl. No.: 21,202

[22] Filed: Feb. 23, 1993

[51] Int. Cl.[5] ............................................. G01S 15/93
[52] U.S. Cl. ..................................... 367/099; 367/98; 367/909
[58] Field of Search .................. 367/909, 105, 103, 98, 367/112, 115, 88, 99

[56] References Cited

U.S. PATENT DOCUMENTS

| | | | |
|---|---|---|---|
| 3,617,996 | 11/1971 | Herbert | 367/105 |
| 3,740,705 | 6/1973 | Lowrance | 367/909 |
| 3,886,487 | 5/1975 | Walsh et al. | 367/909 |
| 4,920,520 | 4/1990 | Gobel et al. | 367/99 |
| 5,142,502 | 8/1992 | Wilcox et al. | 367/88 |
| 5,142,505 | 8/1992 | Peynaud | 367/103 |

*Primary Examiner*—Daniel T. Pihulic

[57] ABSTRACT

A device to warn a ship crew of submerged objects in their immediate vicinity, combined with alarm and logging facilities. The device is composed of one or more sonic or ultra sonic transducers placed aboard the ship, with coverage arranged so as to give surrounding "envelope" to the sides and to the area ahead of the vessel, as well as some predetermined downward looking angle. The transducer or transducers are connected to an electronic distance measuring device that will measure distance to possible obstacles, similar to conventional sonar techniques. The measurements in each direction are compared by an electronic processor against a table of minimum distances, and if the distance falls below the predetermined value for a given direction, an alarm is activated. In addition, all alarms, cancellations of alarms, activation and deactivation of the system are logged automatically with an identification of the operator.

19 Claims, 4 Drawing Sheets

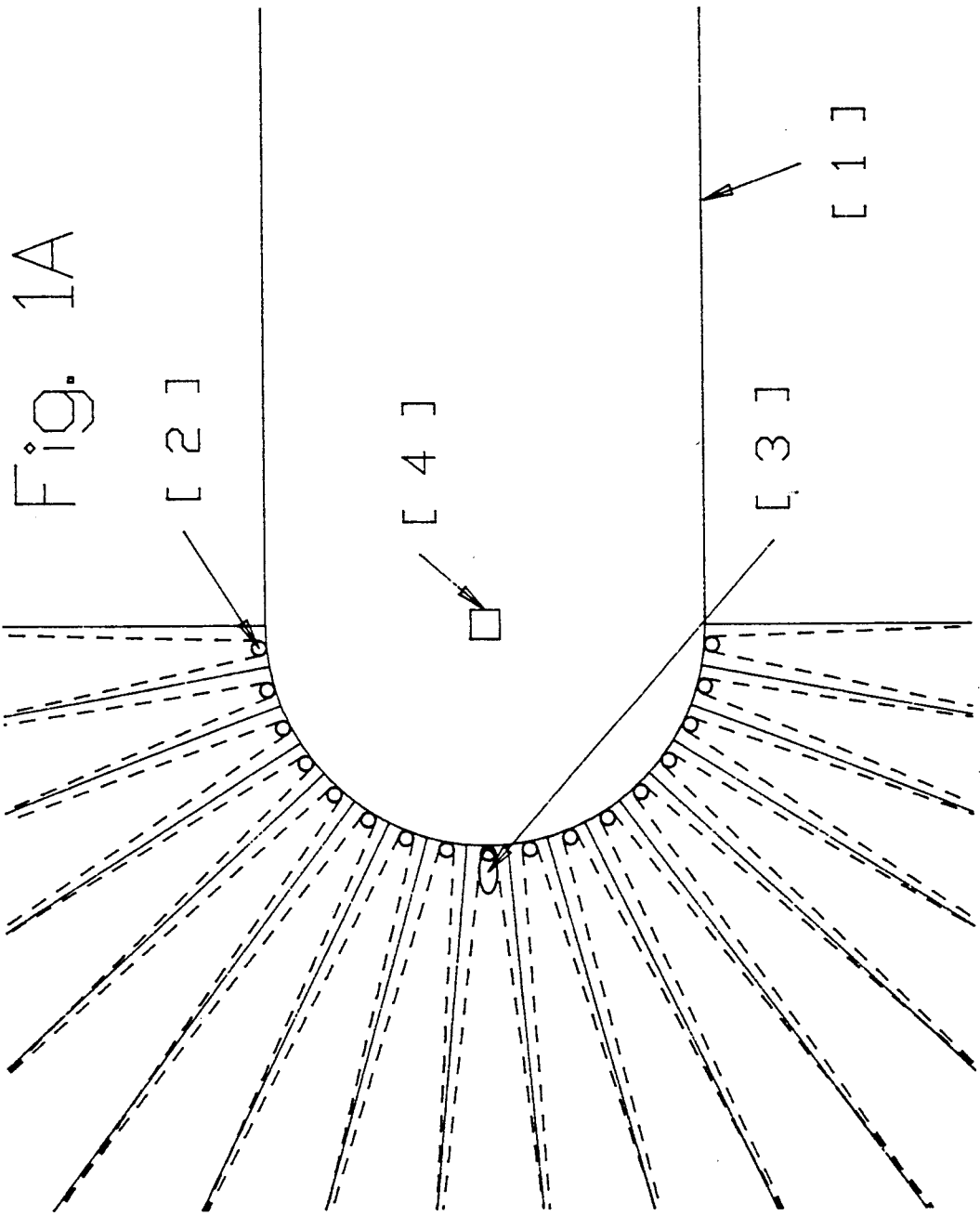

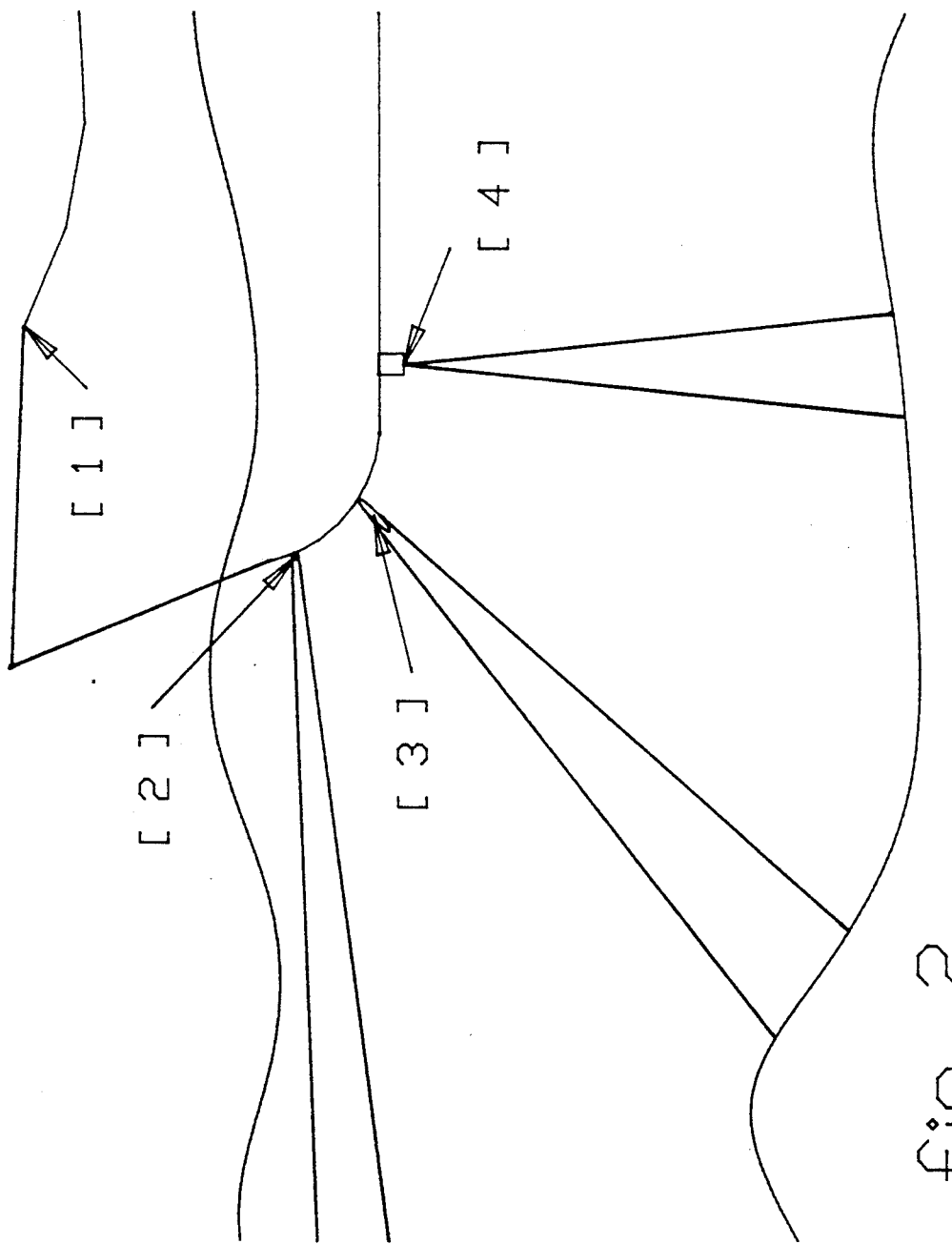

SUBMERGED OBJECT WARNING AND LOGGING SYSTEM

TECHNICAL FIELD OF INVENTION

The invention relates in general to sonar based collision avoidance and in particular to prevention of collisions and grounding of ships such as marine oil tankers by using a sonar based early warning and logging system.

BACKGROUND OF INVENTION

A simple analysis of recent maritime disasters involving grounding of large vessels shows a need for a device that will warn the ships personnel of rocks and other sunken obstacles in their immediate surroundings. Most noteworthy are the recent Exxon Valdez oil spill in Alaska and the Queen Elizabeth II grounding on an uncharted rock on the Connecticut shores. In both those cases, the personnel on the bridge could have benefited from an alarm that would warn against rocks or other such obstacles in the vicinity. It would alarm the crew and demand attention and reevaluation of the ships location. If the alarm indicates the direction of the threat, ship's crew or even an automated steering mechanism could prevent the grounding or reduce the impact. It is also noted that many obstacles large and massive enough to cause damage to sizable ships are frequently in groups. Therefore, a warning of a rock where one should not be is likely to cause the crew to reevaluate its position, slow down, or take other preventive measures.

The methods of underwater object detection by sonic echoes are common and well established and described by such as U.S. Pat. No. 3,740,705. Other range finding and scanning devices have been registered, such as U.S. Pat. No. 3,886,487, and specific transducers for primarily horizontal detection have been described in patents such as U.S. Pat. No. 5,142,505. Those patents describe scanning sonar transducers, method of overcoming wave clutter, and phased array transducer. However, no art was found to deal with an envelope type protection combined with a directionally adjusted alarm range, and logging capacity. In addition, most prior art, such as U.S. Pat. Nos. 3,740,705 and 3,886,487 relate to increasing accuracy of the detection system. Numerous patents have described methods of guidance of vehicles using sonar, such as U.S. Pat. No. 4,920,520 and many methods have been devised to increase accuracy and resolution of detection by different phasing methods and other such means.

OBJECTS OF THE INVENTION

All the above described art does not address some key issues. The first and foremost is the need for an alarm system that will sense the existence of large obstacles in the immediate vicinity of the ship from the sides as well as in the direction of travel, no method attached an alarm that will respond to large objects in a "variable security zone envelope" around the ship. In addition, none have provided for logging of the information, which will tend to increase usage of such system as well as aid in investigating an accident in case it does happen. It should be noted however that the specific detection method is of little importance to the invention.

The present invention has little interest in accuracy and the capability for high resolution. On the contrary, the invention uses a threshold mechanism to prevent the system from triggering on a small object return. The premise here is that only a massive echo, massive enough to cause damage to the ship should cause alarm, minimizing the false alarms. This should allow for a lower manufacturing cost. The capability of setting varying ranges for the alarm according to individual directions increase significantly the usefulness of such a device as compared to prior inventions based on simple scanning and display device or a single direction device. The invention also has an advantage over a device with a single range alarm, equal in all directions, since it allows different alarm ranges to be set in each direction. The system will allow overrides of the default distance settings but all override commands are logged and the person issuing that command is identified by means of a personal key, magnetic card, password, or any other identifying combination. The identity is logged together with the command, time stamp, and possibly location information obtained from other aids to navigation, (e.g. position as obtained from the Global Positioning System, heading, speed, etc.). This log will ease the investigation of accidents when they do happen. The logging will also encourage the ship crew to keep the system turned on, since time of will be registered. Logging will also include periods of shutdown, power failures, etc. All the above moves the invention from the realm of a simple sonar with horizontal detection capability to a full collision prevention and accident tracing facilitator.

A device that only warns the ship's crew, or even alters the ships heading, would become a nuisance once the crew is fully aware of the situation. Therefore, some means of disabling the device should be provided. However, if such disabling is logged in a manner that will prevent further alteration in the log, such disablement will be done for the minimal needed period, and the device is likely to be activated most of the time. Such logging capabilities are relatively trivial to implement using such devices as coded disk files, EEPROM, and other recording media similar to airplane "black boxes". However, currently there is no device that will incorporate detection in many directions, a setable alarm in different bearings from the ship, and logging of all detections and commands given to the system.

Therefore, this invention suggests a device that will create a variable "security zone" envelope directed in the direction of the ship's bow and radiating to 90 degrees or more on each side of the ship, as well as angled downward monitoring in the direction of the ship's heading and simple depth monitoring. It will provide early warning for large submerged objects, indicate the direction of such objects, and log all activities, detection as well as disabling, and other commands given to the device. All logging will record the identity of the person issuing the command.

BRIEF DESCRIPTION OF THE DRAWINGS

FIGS. 1 and 1A are top views of a ship equipped with the present invention;

FIG. 2 is a side view of a ship equipped with the present invention; and

GENERAL DESCRIPTION OF THE INVENTION

The invention is composed of one or more transducers [2], mounted aboard the ship under the water line, and arranged in such a way so as to irradiate a volume around the ship in the direction of travel as well as to the sides of the ship and ahead and below it[3],[4]. The transducers are connected to one or more distance measuring devices[9]. echoes returned to the transducers are assumed to indicate the existence of obstacles near the ship. As in all sonar circuits, the time difference between the transnmitted energy pulse and the received echo is proportional to a distance to an obstacle, and signal strength, in combination with the above distance give some indication as to the size and consistency of the obstacle. The distance and relative strength measurements are passed to a controller unit[10]. The controller or the distance measuring device filter out echoes that do not pass a minimum strength threshold level, to insure that only a massive object will trigger the alarm. The logic circuit compares the distance to the obstacle against a table entry. ( an example of such table is given in Table 1.) The table indicates alarm range per direction. If the detected range falls below the table range for the given direction, an alarm [11] is activated, and optionally, a display indicates the direction of the obstacle. The alarm is noted in a logging device[15]. The logging device can be a dedicated part of the system or a part of an already existing logging system aboard the ship. The system provides capabilities for user input using an input device such as keyboard[14], allowing for acknowledgment of an alarm, disabling and enabling the system or disabling detection in one or more directions, setting of the range—bearing table and threshold levels, etc. The logging device is capable of accepting data from other devices such as GPS, Autopilot, Loran, engine and steering commands, gyro compass, etc.

DESCRIPTION OF EXAMPLE EMBODIMENT

The detection mechanism can be one of any number of sonar methods such as described in the U.S. patents mentioned above, including but not limited to scanning sonar, phased array sonar, narrow beam sonar, Doppler effect sonar etc. One of the simplest configurations is depicted here.

Figure 1:
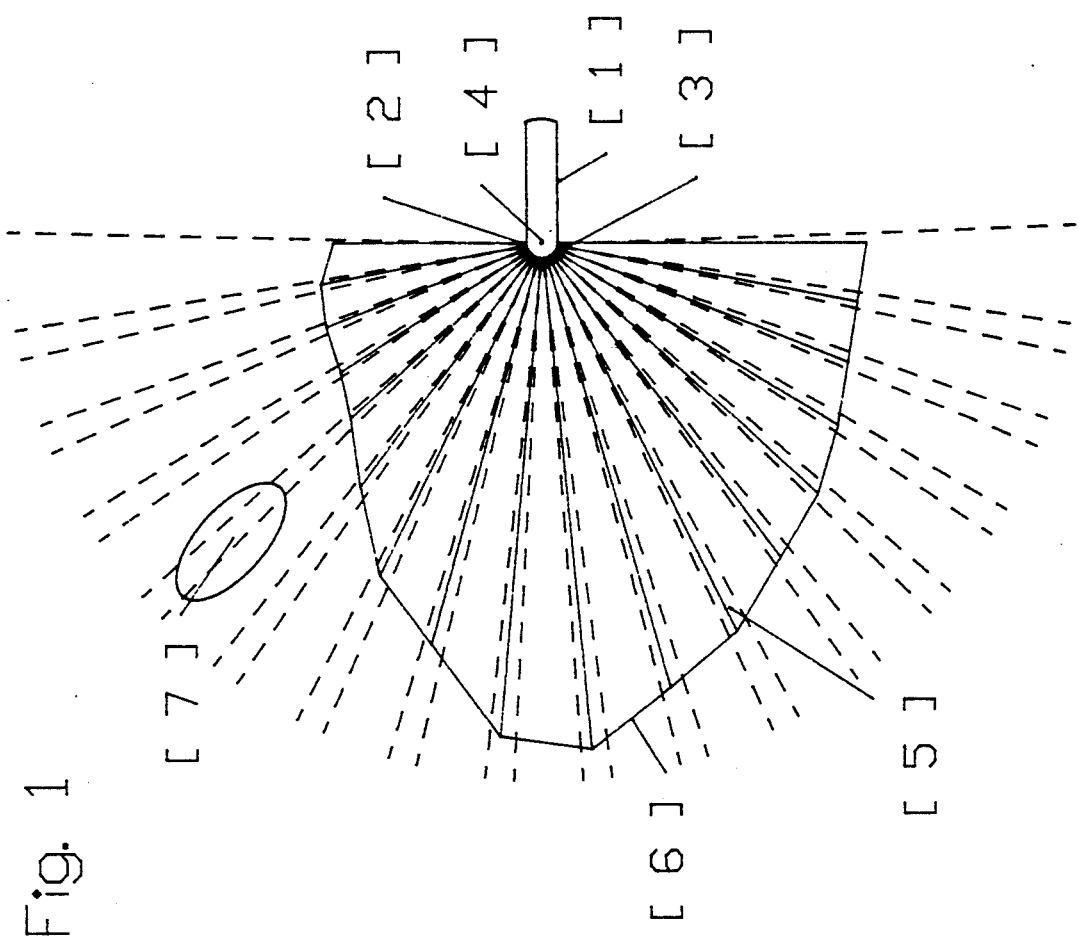

FIG. 1 is a schematic representation of a top view of a ship[1] cut at the bilge level. The ships forward perimeter is surrounded by a number of sonic or ultra sonic transducers[2]. (Only one is marked explicitly in the drawing, and a circle is used to symbolize that type of transducer) Two transducers are mounted at the bow of the ship. One transducer is similar to the rest of the transducers[2] placed around the ship while the second transducer[3], symbolized by an ellipse, radiates at a given angle downward. Another transducer [4] is a simple depth sounder type, measuring the depth of the water below the hull. The dotted lines are shown only to symbolize the transducers effective detection cones which overlap to provide full coverage in the direction of travel around the front and sides of the ship. The transducers can be mounted to the ships hull in any convenient way such as bolts, glue, etc. and can be shaped in hydrodynamic fairing or molding. The lines marked [5] are representing the distances as set up in the range - bearing table of Table 1, Connecting the outer endpoints of the lines [5] create a forward "security zone envelope" noted by the number [6]. The obstacle [7] is displayed as an example of an arbitrary obstacle big enough to endanger the ship. It should be noted that the envelope is set closer to the ship on the side of a known threat. Insert FIG. 1A is simply a magnified view of the ships bow, allowing better understanding of the details.

FIG. 2 is a side view of the ship, to provide a 3 dimensional notion of the coverage arrangement. Only one directional transducer [2] is drawn for clarity. The downward angled transducer [3] and the downward ( depth measurement ) transducer [4] are shown with overlapping radiation cones.

Figure 3:
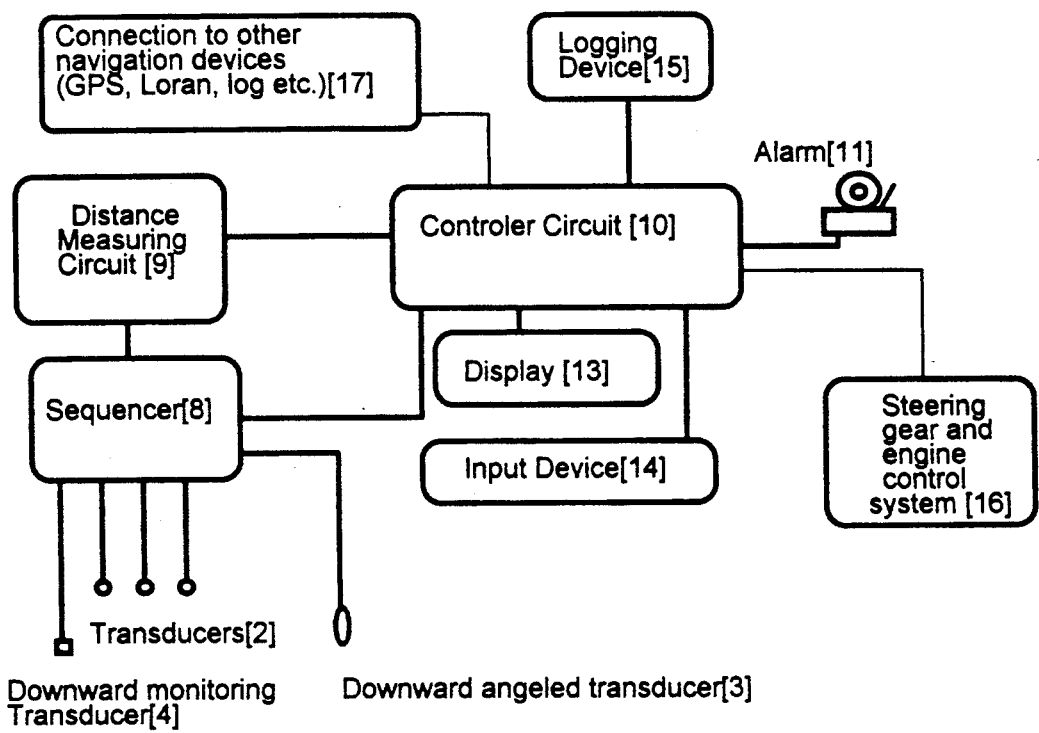
FIG. 3 is a block diagram of the control and electronic circuitry.

FIG. 3 control and electronic circuitry. The transducers[2] [3] and [4] are connected to a sequencer circuit[8] that switches each of them and connect it to a distance measuring device[9]. The sequencer is operated in response to a signal from the control circuit[10]. The distance measuring device[9], similar in design to any number of underwater echo sounding devices, is capable of passing information on the distance of the echo as well as the relative strength of the echo in a digital form. The device[9] can be arranged so as to shift the transmitted frequency by a small amount or to otherwise encode the signal going to each transducer to allow a returned echo to be identified as to which transducer sent the original sonic pulse. Any echo detected will be passed to the control circuit[10], together with the return signal relative strength information. The controller circuit will filter out (by software or hardware) signals that do not pass a certain minimum threshold. This will insure that only strong echoes, such as those returned from large, massive bodies, will cause an alarm. The distance to targets that passed minimum threshold is compared with a table such as the one in Table 1, which contains minimum distances for each direction. If the distance is smaller, an alarm[11] is activated. Additionally, a visual indication is given to the direction of the obstacle on a display[13]. The alarm can be deactivated only by entering a personal code on the input device[14] or using another personal identification device such as a key, or a magnetic card, or combination of such means. The time, direction, and distance of the obstacle are logged in the logging device[15]. If a connection is installed to other navigation devices on board such as a GPS, Loran, gyro, etc.[17], the logging device will log their input as well. The deactivation of the alarm will be registered on the logging device as well, with the personal identification of the disabling person. After the audio part of the alarm is deactivated, a visual alarm will be displayed as long as the obstacle is observed by the system. The control circuit continue to scan the envelope, and will trigger a new alarm if a new obstacle is detected.

Optionally, after detection that caused alarm, all maneuvering information such as engine commands and steering commands can be logged as well, to give a more complete record of all activities that followed a detection event.

Optionally, if the obstacle comes into even closer distance to the ship, as determined by a second minimum distance table, a second alarm is activated, and possibly, the link [16] to the ship steering gear or the ship's engines may be operated by the controller[10] to avoid the danger.

Table 1 is a table of distances, giving each transducer, correlating it to a direction relative to the ship's heading, and display setting in meters of the minimum range under which a detection of an obstacle will generate an alarm.

The controller can be a simple computer such as a personal computer, with battery back-up power. Table 2 is a description of an algorithm for the control of such a computer. The algorithm uses occasionally a notation similar to that of the C++ computer language, most notably the use of the '//' symbol to indicate the beginning of a remark. Such remark ends at the end of the line. The algorithm refer to the table in table 1 as the variable "envelope", and to the distance measuring device[9] as the stream variable "DME". Alarms are stored in a linked list pointed to by the variable "alarms". It is assumed that linked list operations are well known in the programming trade.

The algorithm in Table 2 uses two functions that have not been defined. One named "step_direction" sends a command to the sequencer[8] to connect a new transducer to the distance measuring device[9], and send a command to the distance measuring to begin a measuring cycle. The second function, "compute_relative_strength", will assign values, determined empirically, to the echo strength in a way that will consider the distance versus the strength of the echo, and return a value that will compensate for diminishing signal level as a result of greater distance. This is done because signal strength is dependent to a degree on distance as well as the mass/size of the returning body. Thus, a small object near the ship may return a signal amplitude similar to a large but further object. Using that function will minimize false alarms.

Table 2 sets forth a general example procedure for operation of the Controller Circuit[10]for the operation of the invention.

The control circuit[10] will allow setting of the range-bearing table, temporary disabling of part or all the system, setting the sensitivity threshold, and other commands to the system. This is done via input device [14]. The control circuit[10] will log each such command from the user on logging device[151. The crew is allowed to disable some or all of the system when they approach a danger they are well aware of without being distracted by continuous alarms. Of course, while navigating in narrow waterways, the use of automatic devices that alter the ships heading should not be allowed. But the main purpose of the device is to alert the ship crew to a danger they are not aware of, not to replace their judgment.

While the text above is a usable embodiment, the system can be further developed to include some or all of the following additions.

Multi level alarm can be added to create an envelope inside the outer envelope and closer to the ship. Detection within that inner envelope will trigger another alarm or possibly alter the ship course or reverse the ship engines;

Empirical testing can be used to refine the algorithm of table 2 to prevent false alarms and increase detection reliability.

In addition, an adapter could be added to log every command given the ship engine and steering gear. Doing so will facilitate accident reconstruction.

An algorithm of relative motion may be applied to the system, to be used as additional filter to prevent repetitive false alarms.

The algorithm of table 2 can be changed to utilize interrupts and process data in real time.

The system can be expanded to respond to more than one obstacle in a given direction. The display can be used to display all system detection's, even if the detection did not caused alarm.

The display system can be improved by color and graphics. A graphical display and user interface can be added to the invention to make the system interface easier to use.

TABLE 1 bearing-range table example.
(please note that distance may be varied by ships crew).

| Transducer Number | Relative Direction (ships heading is 0) | Distance to Activate Alarm (Meters) |
|---|---|---|
| 0 | −90 | 200 |
| 1 | −80 | 220 |
| 2 | −70 | 240 |
| 3 | −60 | 200 |
| 4 | −50 | 250 |
| 5 | −40 | 350 |
| 6 | −30 | 450 |
| 7 | −20 | 550 |
| 8 | −10 | 700 |
| 9 | 0 | 800 |
| 10 | 10 | 700 |
| 11 | 20 | 550 |
| 12 | 30 | 500 |
| 13 | 40 | 450 |
| 14 | 50 | 400 |
| 15 | 60 | 420 |
| 16 | 70 | 420 |
| 17 | 80 | 420 |
| 18 | 90 | 420 |
| 19 | downward angled | 800 |
| 20 | downward | 60 |

TABLE 2

General algorithm for control of the controller circuit[10]

```
DME is defined as the Distance Measuring Circuit [9];
struct alarm {
    int direction;
    int distance;
    int counter;
    int active;
    struct alarm *next;
}
struct alarm *alarms; // Pointer to first element in
alarms linked list
procedure Main
{
Reset system;
do forever
{
  call scan envelope
  if( new alarms flagged )
  {
    activate alarm
    log alarm in logging device
  }
  poll ships engine and steering system for status
  if( any alarm currently active )
  {
    read ship engines control statu[13]
    log any changes in logging device
    read ship steering control status[13]
    log any changes in logging device
  }
  call display system status
  call process human input
}
}
End Main Procedure
Procedure scan envelope
{
  for each transducer do
  {
    step direction ( ); // begin scanning of sector covered by
    transducer
    dist = get distance from DME;
    echo = get echo strength from DME
    // use distance to scale amplitude to uniform scale
    representing object size / mass
    weighted_echo_amplitude = compute_relative_strength
    ( echo, dist )
    if(weighted_echo_amplitude >= threshold) // disregard
    small objects
```

TABLE 2-continued

General algorithm for control of the controller circuit[10]

```
{
if(dist < envelope setting for that direction)
  {
  // check if a matching alarm already exist in system
  for each ( alarm = entry in alarms list ) do
    {
    if(alarm direction = = transducer)
      {
      // repeated detection. step to next transducer alarm
      counter = 0; // reset counter to prevent false alarms
      continue;
      }
    else if( alarm.direction is from a transducer
    adjacent to current transducer)
      {
      // Ships movement caused the target to be detected by
      another transducer.
      // reflect change in data structure.
      alarm.direction = transducer
      continue;
      }
    else
      {
      // the echo represent new target. Enter into data
      structure and set alarm.
      create and link new entry in alarms linked list,
      record direction, distance, and mark entry active.
      set new alarm flag
      log alarm in log file
      }
    }
  }
else
  {
  for each (entry in alarms list) do
    {
    if( entry is same direction as current transducer )
      {
      increment counter in entry
      if (counter > 5)  // The number 5 is arbitrary and
                       // determined empirically to prevent
                       recurrent alarms on same object.
        {
        remove entry from list.
        }
      }
    }
  }
}
End procedure scan envelope
Procedure display system status
{
if(alarms list not empty) // display all alarms
  {
  for each element in alarm list
    {
    draw alarm symbol on display [13], using direction,
    distance and alarm status
    }
  }
}
End procedure display system status
procedure process human input
{
command = read user input
if( recognizable system command)
  {
  if(command require logging)
  verify user identity and log in logging device
  // Handle user commands here. Some example
  commands follow.
  switch (command)
    {
    case DEACTIVATE_SYSTEM:
      request explanation from user
      log explanation in logging device
    case ACKNOWLEDGE_ALARM:
      for each entry in alarms
      entry active = FALSE;
      reset new alarm flag
      log acknowledgment in logging device
    case CHANGE_ENVELOPE:
      display envelope table
      ask which changes are requested and change table
      accordingly
      log changes on logging device
    case CHANGE SENSITIVITY:
      threshold = user input
      log new threshold on logging device
      .
      .
      // handle all other commands such as display log,
      temporary deactivation, etc.
      .
      .
    }
  }
}
end procedure process human input
```

I claim:

1. A ship warning system for providing detection and warning of submerged objects comprising:

transducer means mounted on the ship and constructed to provide multidirectional radiation of detection signals at least in a direction of travel of the ship, below the ship, and radiating sideways from the ship's heading, said transducer means also including detectors for receiving detection signals reflected from submerged objects;

a detection signal processing system for measuring the distance and bearing of submerged objects based on reflected detection signals;

said detection signal process system defining an envelope of selected distances and bearings from the ship for flagging a submerged object detected within said envelope;

said detection signal processing system comprising a variable control of setting the specified distances and bearings for defining and varying the dimensions of the envelope; and warning means for providing an indication upon detection of a submerged object within the defined envelope.

2. The ship warning system of claim 1 wherein the detection signal processing system is constructed to measure the intensity of reflected detection signals as well as the distance of submerged objects reflecting detection signals and to exclude signals based upon selection combinations of distance and intensity correlated with size of submerged objects.

3. The ship warning system of claim 1 wherein the transducer means comprises an array of sonar transducers distributed at least around the front portion of the hull of the ship below the water line and wherein the detection signal processing system is constructed for separate processing of the detection signals from respective transducers of the array.

4. The ship warning system of claim 2 wherein the detection signal processing system is adjustable for varying the selected combination of distance and intensity for excluding signals according to correlation with size of submerged objects.

5. The ship warning system of claim 1 further comprising a logging device coupled to the detection signal processing system for recording a log of submerged object detection events.

6. The ship warning system of claim 5 wherein the detection signal processing system comprises a user entry input for entering user data and commands, including identity of the user and verification of user identity, said logging device also being coupled to record said user identity and commands.

7. The ship warning system of claim 5 comprising at least one navigation device coupled to the detection signal processing system for providing additional navigational information Said logging device being constructed to log the additional navigational information along with the log of submerged objects detection events.

8. The ship warning system of claim 1 comprising a display coupled to the detection signal processing system for displaying said envelope and detected submerged objects.

9. The ship warning system of claim 5 wherein the selected combination of intensity and distance parameters for excluding detection signals reflected from submerged objects is set for detecting relatively large submerged objects.

10. The ship warning system of claim 6 wherein the logging device and user entry input are constructed for logging user override of a submerged object detection event and deactivation of the warning indication along with identification of the user.

11. The ship warning system of claim 3 wherein the detection signal processing system is constructed to process said separate detection signals from the respective transducers in sequence.

12. The ship warning system of claim 4 wherein the detection signal processing system is coupled to the ship control system for controlling a navigation parameter of the ship in response to specified submerged object detection event and for logging maneuvering information during occurrence of a detection event.

13. The ship warning system of claim 4 wherein the detection signal processing system comprises a programmable controller including a program memory, a control program stored in the memory, and a table of bearings and distances defining the envelope.

14. A ship warning system for providing detection and warning of submerged objects comprising:
    transducer means mounted on the ship and constructed to provide multidirectional radiation of detection signals at least in a direction of travel of the ship, below the ship, and radiating sideways from the ship's heading, said transducer means also including detectors for receiving detection signals reflected from submerged objects;
    a detection signal processing system for measuring the distance and bearing of submerged objects based on reflected detection signals;
    said detection signal processing system defining an envelope of selected distances and bearings from the ship for flagging a submerged object detected within said envelope;
    warning means for providing an indication upon detection of a submerged object within the defined envelope;
    said detection signal processing system being constructed to measure the intensity of reflected detection signals as well as the distance of submerged objects reflecting detection signals and to exclude reflected detection signals based upon selected combinations of distance and intensity correlated with size of submerged objects; said detection signal processing system being constructed to provide variable control for setting the specified range in bearing distance for defining and varying the dimensions of the envelope, and to provide variable control for varying the selected combinations of distance and amplitude for excluding signals correlated with size of submerged objects.

15. The ship warning system of claim 14 further comprising a logging device coupled to the detection signal processing system for recording a log of submerged object detection events;
    said detection signal processing system comprising a user entry input for entering user data and commands, including identity of the user and verification of user identity, said logging device being coupled to record said user identity and commands;
    at least one navigational device coupled to the detection signal processing for providing additional navigational information, said logging device being constructed to log the additional navigational information along with the log of submerged object detection events.

16. A ship warning system for providing detection and warning of submerged objects comprising:
    transducer means mounted on the ship and constructed to provide multidirectional radiation of detection signals at least in the direction of travel of the ship, said transducer means also including detectors for receiving detection signals reflected from submerged objects;
    a detection signal processing system for measuring the distance and bearing of submerged objects based on reflected detection signals;
    said detection signal processing system defining an imaginary envelope outside the hull of the ship at selected distances and bearings from the hull of the ship and surrounding at least the forward portion of the hull for flagging a submerged object detected within said envelope;
    a logging device coupled to the detection signal processing system for recording a log of submerged object detection events;
    said detection signal processing system comprising a user entry input for entering user data and commands, including identity of the user and verification of user identity, said logging device also being coupled to record said user identity and commands.

17. The ship warning system of claim 16 comprising an alarm coupled to the detection signal processing system and constructed to warn a submerged object detected within said envelope.

18. The ship warning system of claim 16 wherein the detection signal processing system is constructed to measure the amplitude of reflected detection signals as well as the distance of submerged objects reflecting detection signals and to exclude signals based upon selected combinations of distance and intensity correlated with size of submerged objects.

19. The ship warning system of claim 7 wherein the logging device is constructed to collect data from other navigational devices including GPS, LORAN, compass, speed log, and engine commands.

* * * * *